H. F. HOLBROOK.
AUTOMOBILE WIND SHIELD.
APPLICATION FILED JAN. 29, 1909.
932,126.
Patented Aug. 24, 1909.
2 SHEETS—SHEET 2.
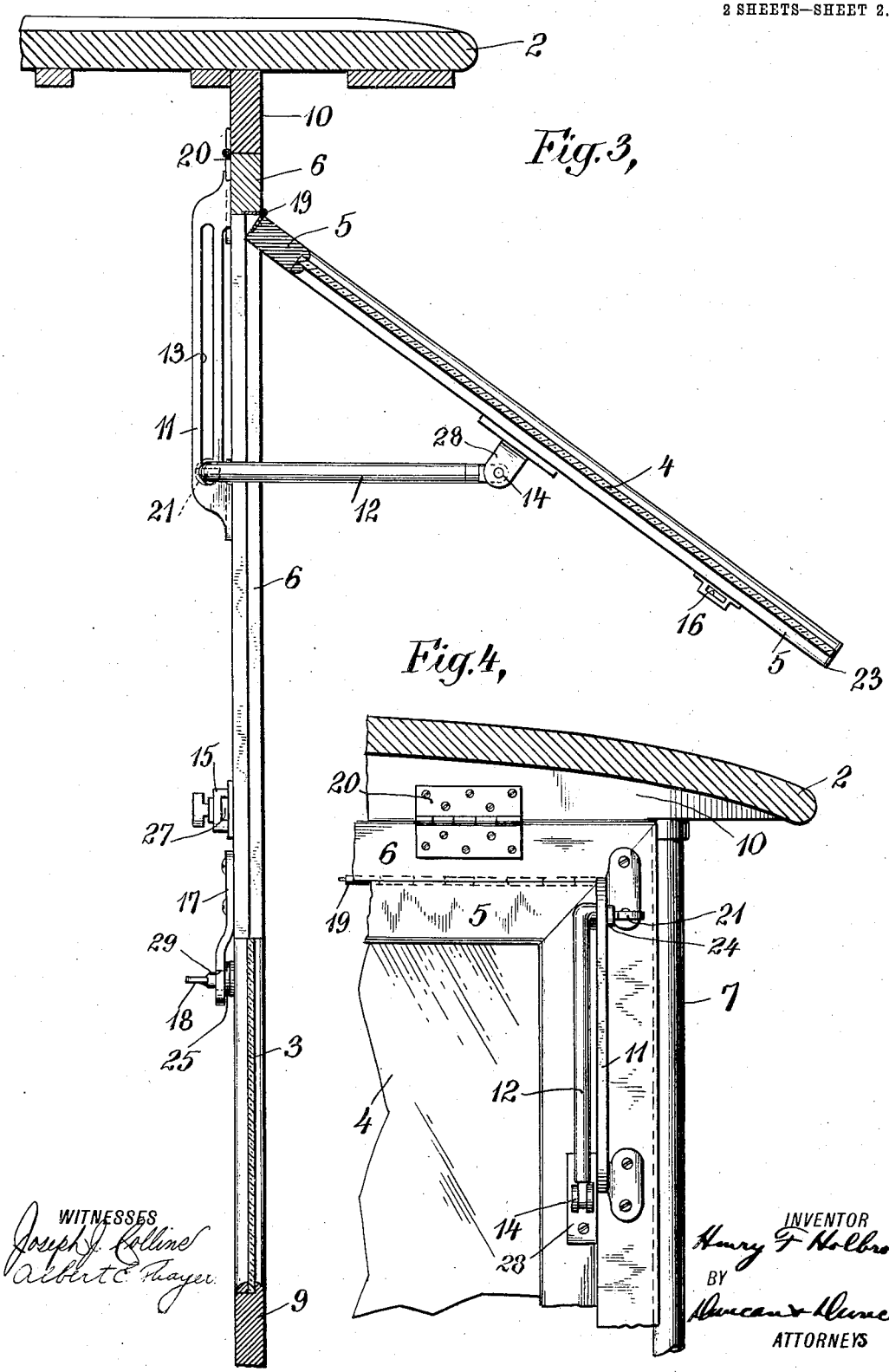

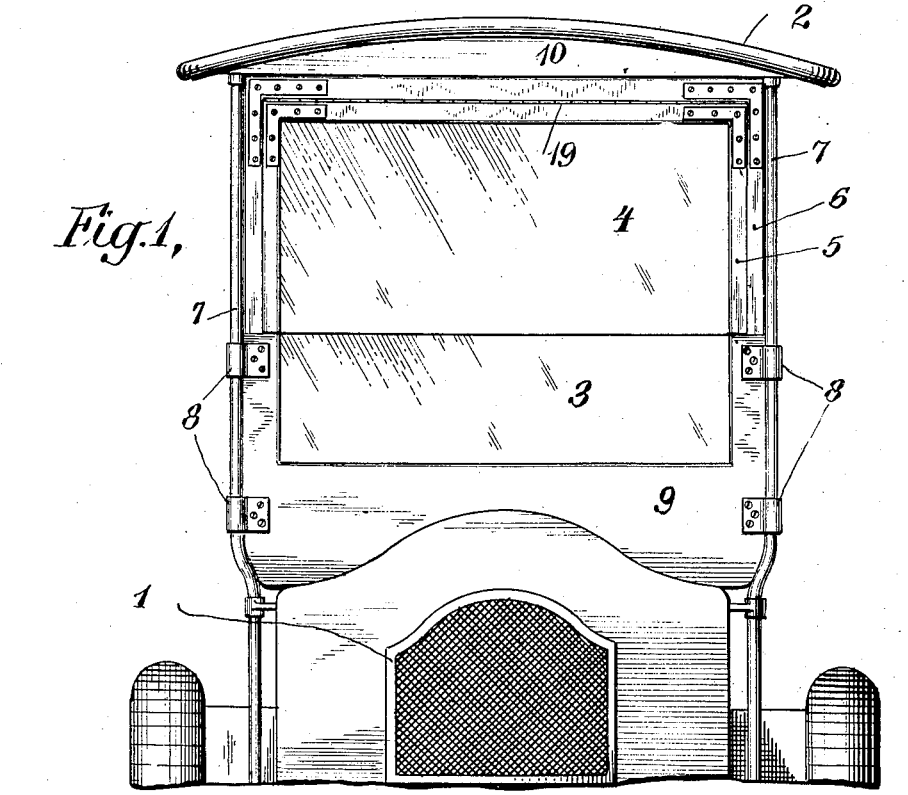
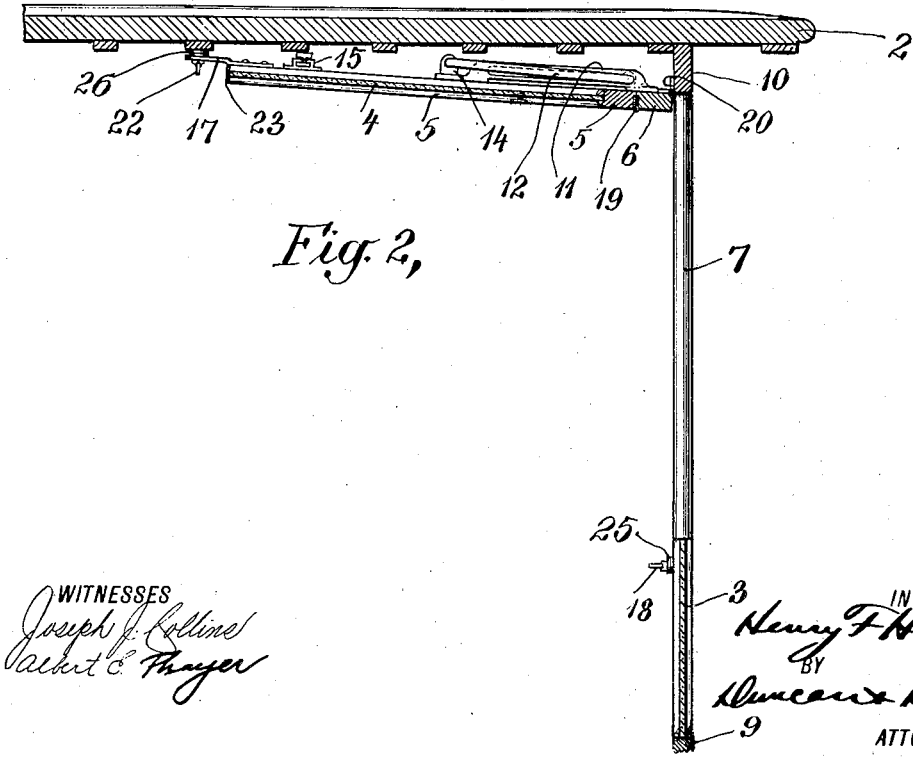

UNITED STATES PATENT OFFICE.

HENRY F. HOLBROOK, OF NEW YORK, N. Y., ASSIGNOR TO HOLBROOK-SINGER COMPANY, OF NEW YORK, N. Y., A CORPORATION OF NEW YORK.

AUTOMOBILE WIND-SHIELD.

932,126.  Specification of Letters Patent.   Patented Aug. 24, 1909.

Application filed January 29, 1909. Serial No. 474,932.

*To all whom it may concern:*

Be it known that I, HENRY F. HOLBROOK, a citizen of the United States, and resident of the city, county, and State of New York, have made a certain new and useful Invention Relating to Automobile Wind-Shields, of which the following is a specification, taken in connection with the accompanying drawings, forming part of the same.

This invention relates to wind shields for automobiles or other vehicles, and relates especially to a device comprising a forwardly swinging shield member hinged upon and adjustably mounted with respect to a support, this support and shield being movably mounted upon a top member so as to be bodily swung up and held against the automobile top when not in use.

In the illustrative embodiment of this invention shown in the drawings, Figure 1 is a front elevation. Fig. 2 is a side sectional view showing the shield and support raised into inoperative position. Fig. 3 is a similar view on a larger scale showing the shield swung outward. Fig. 4 is an enlarged partial rear view.

In the illustrative embodiment of this invention shown in the drawings, the automobile of ordinary construction is indicated as provided with a hood 1 and top 2 supported by the front bars 7 in the usual way. If desired, a front 3 of glass or other suitable material forming a permanent lower shield section may be supported in the front frame 9 secured by clips 8 to the front bars 7. The support 6 may be movably mounted in any desired way as by hinging it to the top member 10 secured to the top 2, suitable hinges 20 being employed for this purpose. Suitable locking means, such as one or more lock plates 17 secured to this support, are adapted to coöperate with suitable locking buttons 18 which after passing through slots 29 in the lock plates can be turned so as to tightly hold the plates against suitable yielding washers 25 in contact with the front frame so as to hold the support rigidly in operative position in alinement with the front frame. The support and connected parts may, however, be swung upward into the inoperative position indicated in Fig. 2 and rigidly held therein by similar locking buttons 22 engaging the lock plates 17 and holding them firmly against the yielding washers 26 so as to minimize vibration.

The shield 4 of glass or other suitable material may be mounted in the shield frame 5 in any desired manner, the retainers 23 preferably engaging the outer parts of the shield at its lower edge so as to hold it securely in the frame. The shield may be pivotally connected to the support by the piano hinge 19 extending along the entire upper side of the shield frame if desired. By the use of suitable adjusting means connecting the shield and support the shield may be swung forward to the extent desired to allow ingress of air, while at the same time the extent of the forward projection of the lower edge of the shield beyond the front correspondingly prevents the entrance of rain. If desired, suitable brackets 28 may be mounted on the shield frame and may be provided with the pins 14 engaging the arms 12. The arms are provided with bent portions coöperating with slots 13 in the adjusting bars 11 mounted on the support 6 at either side of the same and thumb screws 21 in the ends of the arms are provided to clamp the arms in the adjusted position in connection with interposed washers 24, see Fig. 4. In this way the shield may be readily adjusted and held firmly in extended position, suitable latches 15 being provided if desired upon the support so that their latch bars 27 coöperate with the sockets 16 on the shield frame 5 so as to securely hold the shield when lowered against the support 6 in closed position. The shield and support are thus firmly held in alinement and may thus be simultaneously swung up out of the way and secured upon the top as indicated in Fig. 2, leaving the machine front between the bars 7 entirely unobstructed. The shield can of course be readily installed on a machine and removed therefrom without defacement.

Having described this invention in connection with an illustrative embodiment thereof, to the details of which disclosure the invention is not of course to be limited, what is claimed as new and what is desired to be secured by Letters Patent is set forth in the appended claims.

1. In automobile shields, a transparent front mounted in a front frame to be secured in position to form a permanent shield section, a support to be hinged to a top member and provided with lock plates, locking buttons mounted on said front frame to securely lock said support in alinement therewith, said support being adapted to be held in raised inoperative position against the automobile top by said lock plates, adjusting bars mounted on said support, a shield frame hinged to said support and carrying a transparent shield coöperating with said front to form a single observation opening in connection therewith, brackets on said shield frame, arms pivotally connected to said brackets and having thumb screws coöperating with slots in said adjusting bars to adjustably hold said shield when swung forward beyond the plane of said support, sockets on said shield frame and coöperating latches on said support to hold said frame and shield in alinement with said support.

2. In automobile shields, a support to be secured to a top member and provided with locking means to hold said support in operative substantially vertical position on an automobile front and to hold said support in raised inoperative position in connection with the top of the automobile, slotted adjusting bars mounted on said support so as to be substantially parallel thereto, a shield frame hinged to said support and carrying a transparent shield, arms pivotally connected to said shield frame and having tightening members coöperating with the slots in said adjusting bars to adjustably hold said shield when swung forward beyond the plane of said support, said arms being substantially perpendicular to said slots when said shield is swung into extreme forward position and latching means engaging said shield frame to hold said frame in alinement with said support.

3. In automobile shields, a support to be secured to a top member and provided with locking means to hold said support in operative substantially vertical position on an automobile front and to hold said support in raised inoperative position in connection with the top of the automobile, adjusting bars mounted on said support, so as to be substantially parallel thereto, a shield frame hinged at its upper portion to said support and carrying a transparent shield, arms pivotally connected to said shield frame and having tightening members coöperating with said adjusting bars to adjustably hold said shield when swung forward beyond the plane of said support, said arms being transverse with respect to said adjusting bars when said shield is swung into extreme forward position and means to hold said frame in alinement with said support.

4. In automobile shields, a support to be secured in substantially vertical operative position on an automobile front, slotted adjusting bars mounted on said support so as to be substantially parallel thereto, a shield frame hinged to said support and carrying a transparent shield, arms pivotally connected to said shield frame and having tightening members coöperating with the slots in said adjusting bars to adjustably hold said shield when swung forward beyond the plane of said support, said arms being substantially perpendicular to said slots when said shield is swung into extreme forward position and latching means engaging said shield frame to hold said frame in alinement with said support.

5. In automobile shields, a support to be movably secured to a top member and provided with means to hold said support in substantially vertical operative position on an automobile front and to hold said support in raised inoperative position in connection with the automobile top, the shield frame having at its upper edge a substantially continuous hinged connection with said support and carrying a transparent shield, adjusting means comprising pivoted arms having free ends operating in slots to adjustably hold said shield when swung forward beyond the plane of said support to prevent ingress of rain and latching means on said support and shield frame to hold the same in alinement.

HENRY F. HOLBROOK.

Witnesses:
E. B. ARMHAUS,
JOHN GRAHAM.